United States Patent [19]

Kanno

[11] Patent Number: 5,109,192
[45] Date of Patent: Apr. 28, 1992

[54] LOW VOLTAGE POWERED ELECTRICAL TACHOMETER FOR ENGINE

[75] Inventor: Isao Kanno, Hamamatsu, Japan

[73] Assignee: Sanshin Kogyo Kabushiki Kaisha, Hamamatsu, Japan

[21] Appl. No.: 502,542

[22] Filed: Mar. 30, 1990

[30] Foreign Application Priority Data

Mar. 31, 1989 [JP] Japan .................................. 1-78304

[51] Int. Cl.⁵ ............................. G01P 3/48; G01P 3/54
[52] U.S. Cl. .................................................... 324/169
[58] Field of Search ......................... 324/169, 160, 166

[56] References Cited

U.S. PATENT DOCUMENTS 4,190,798  2/1980  Fitzner ............................... 324/169

OTHER PUBLICATIONS

Marston, "Solid-State Tach . . ." Apr./1970 Radio Electronics, pp. 33-38.

*Primary Examiner*—Walter E. Snow
*Attorney, Agent, or Firm*—Ernest A. Beutler

[57] ABSTRACT

A tachometer circuit for an outboard motor wherein battery voltage is switched from a signal generated in the capacitor discharge ignition system for providing a pulsating signal to drive the tachometer of a low voltage so as to reduce the sensitivity to noise.

4 Claims, 2 Drawing Sheets

LOW VOLTAGE POWERED ELECTRICAL TACHOMETER FOR ENGINE

BACKGROUND OF THE INVENTION

This invention relates to an outboard motor and more particularly to an improved tachometer arrangement for an outboard motor.

The desirability of providing an engine speed sensor for outboard motors is well known. Generally, the tachometer for an outboard motor is powered by the generating coil of the power plant which generating coil is employed for supplying power to various accessories of the watercraft. However, as the number of electrical accessories on the watercraft increase, the output of the generating coil also must be increased. However, the load can widely fluctuate and this requires the use of voltage regulators for regulating the voltage so as to provide more uniform loading. However, modern voltage regulators cause the wave form of the output voltage to become rather narrow and spiky when the load is small. As a result, it is necessary to provide a very sensitive tachometer. When the tachometer becomes sensitive, then its readings can be upset by external noise. Furthermore, it is frequently the practice to position the tachometer at a substantial distance from the actual engine. This gives rise to further noise problems and sensitivity difficulties.

It is, therefore, a principal object of this invention to provide an improved tachometer for an outboard motor.

It is a further object of this invention to provide a tachometer for an outboard motor that is powered externally of the generating coil and directly from the spark ignition circuit of the outboard motor so as to permit the use of lower cost and more reliable tachometers.

SUMMARY OF THE INVENTION

This invention is adapted to be embodied in an electrical tachometer for an internal combustion engine having a generator for charging a battery and a capacitor discharge system for firing a spark plug of the associated engine. The capacitor discharge system includes a charging coil for charging a capacitor and a pulser coil for discharging the capacitor to fire the spark plug. In accordance with the invention, circuit means is switched by one of the coils for providing a pulsating signal from the battery to the tachometer that varies in engine speed so as to provide an electrical speed indication.

DETAILED DESCRIPTION OF THE PREFERRED EMBODIMENT OF THE INVENTION

Figure 1:
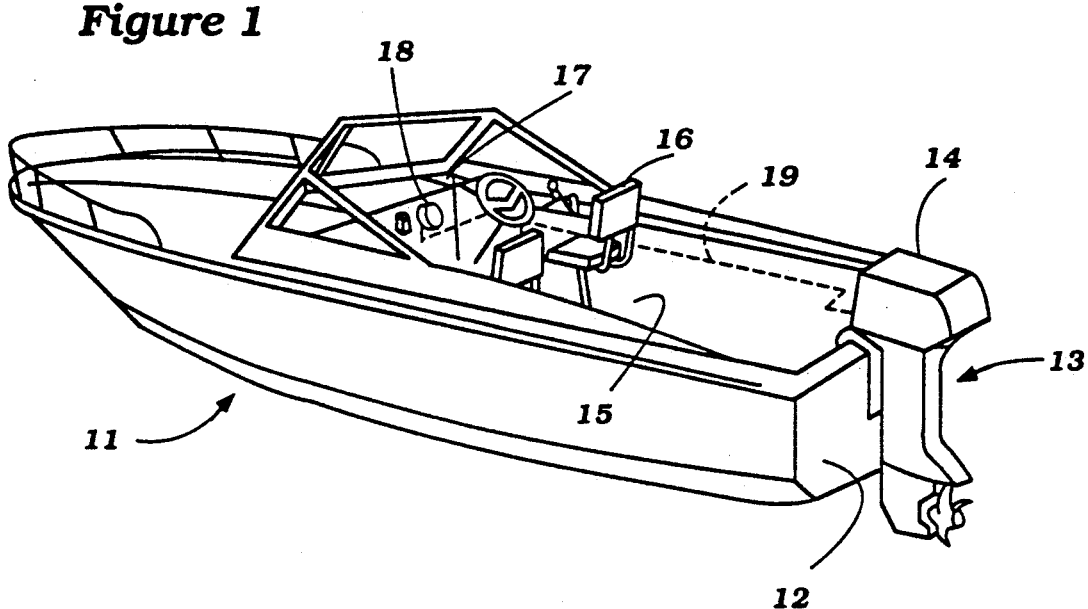
FIG. 1 is a perspective view of a watercraft powered by an outboard motor and having a tachometer constructed in accordance with an embodiment of the invention.

Referring first to FIG. 1, a watercraft constructed in accordance with an embodiment of the invention is identified generally by the reference numeral 11. The invention is described in conjunction with a watercraft because such applications are typical of those wherein the invention may be useful. It is to be understood, however, that the invention may be practiced in connection with other types of applications for internal combustion engines, however, the invention has particular utility in connection with a watercraft.

The watercraft 11 has a transom 12 on which an outboard motor, indicated generally by the reference numeral 13 is positioned. The outboard motor 13 has a power head 14 that is comprised of an internal combustion engine, which may be of any known type, but which includes a magneto generator for firing the spark plugs and for charging a battery, as will be described by particular reference to FIG. 2.

The watercraft 11 is provided with a rider's area 15 having an operator's seat 16 with a bridge 17 positioned forwardly of it. A tachometer 18 of the electrical type is mounted on the bridge 17 in front of the driver's seat 16 and receives an electrical signal from the outboard motor 13 via a conductor 19.

Figure 2:
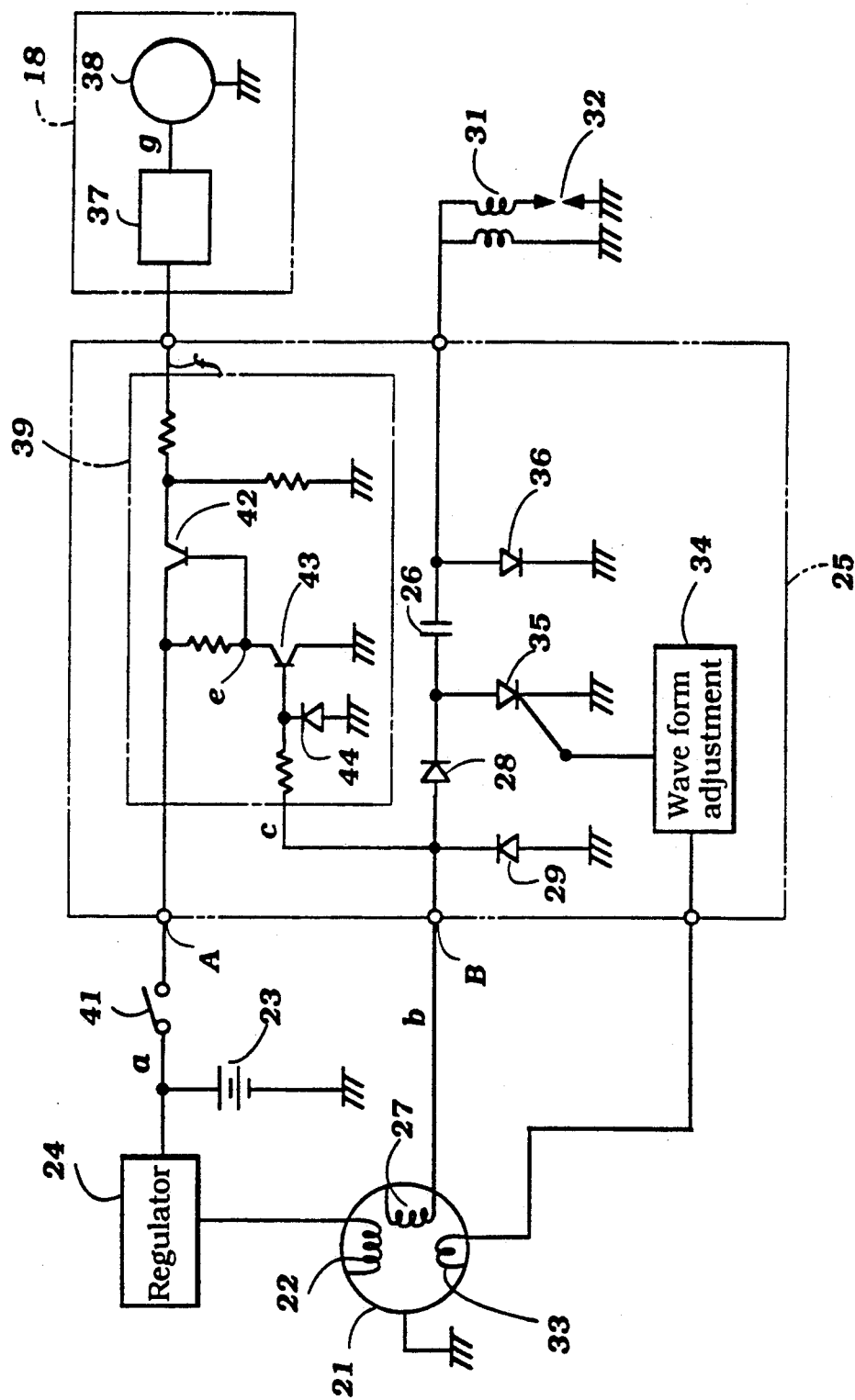
FIG. 2 is a schematic electrical diagram showing the capacitor discharge ignition system for the engine and tachometer engine speed signal generator.

Referring now in detail to FIG. 2, as has been noted, the engine of the power head 14 may be of any known type but it includes a flywheel driven magneto generator indicated generally by the reference numeral 21. This magneto generator 21 includes a generating coil 22 that charges a battery 23 through a voltage regulator 24 of a known type.

The engine is also provided with a capacitor discharge ignition system, indicated generally by the reference numeral 25 that includes a capacitor 26 that is charged by a charging coil 27 of the magneto generator 21 through a circuit including a rectifying diode 28. A further diode 29 connects the charging coil 27 to the ground during the negative half wave cycles. The capacitor 26 is in circuit with a transformer or spark coil 31 that has its secondary winding in circuit with a spark plug shown schematically at 32.

The magneto generator 21 further includes a pulser coil 33 that outputs a signal to a wave form adjusting circuit 34 which will switch an SCR 35 on at the appropriate crank angle for discharging the capacitor 26 and inducing a high voltage in the spark coil 31 for firing the spark plug 32 in a known manner. A further grounding diode 36 is provided in the circuit between the capacitor 26 and the coil 31 as is well known in this art.

Referring to the tachometer 18, it comprises a rotating speed detecting circuit, indicated schematically at 37, which receives pulses, in a manner to be described, from the electrical circuit so as to provide a signal indicative of speed that is transmitted to a display 38 for displaying an engine speed signal. Conventionally, the signal for the detector circuit 37 is provided either from the generating coil 22 directly or from the charging coil 27 or pulser coil 33 of the CDI ignition system. For the reasons aforenoted, these signals per se are not particularly desirable because they require the use of high cost detectors and may be very prone to noise. In accordance with the invention, therefore, a pulsating output from the regulated output of the battery 23 is supplied to the speed detecting circuit 37. This is achieved through a signal generating circuit, indicated generally by the reference numeral 39.

As may be seen, the detecting circuit 39 is provided with a junction A that is in circuit with the battery 23 through a main switch 41. Hence, when the main switch 41 is energized, a voltage signal indicative of the battery voltage a will be present at the junction A. Battery voltage may be either six or twelve volts and is relatively low and thus is not likely to induce any noise into the system.

The circuit 39 generates a pulse f from this battery voltage in the manner now to be described, so as to provide a pulsating square wave that pulsates in frequency with engine speed and, accordingly, provides a relatively low voltage signal to the detecting circuit 37 that permits effective transmission of the signal without noise being induced into the system.

Figure 3:
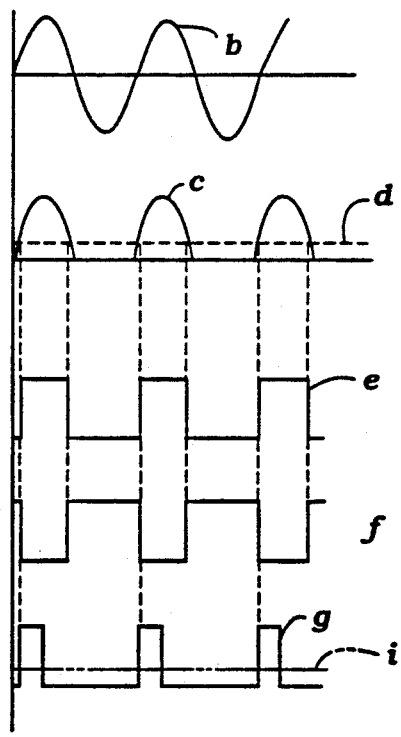
FIG. 3 is a graphical view showing the wave forms at various points in the circuit of FIG. 2.

It will be noted that the voltage b at the junction B from the charging coil 27 will vary sinusoidally as shown in FIG. 3. The diodes 28 and 29 will provide a rectified half wave signal c to the circuit 39 which is utilized to switch a pair of transistors 42 and 43 so as to provide a signal e at the base of the transistor 42 that is of a square wave pattern and output a negative square wave signal f from the transistor 42 to provide the pulsating signal to the speed detecting circiut 37. This generates a square wave signal g to the indicator 38 that then outputs the speed indication. A protective ziener diode 44 is provided in the junction to the base of the transistor 43 so as to protect the transistor 43 from voltage spikes.

It should be readily apparent, therefore, that the described system is effective in providing a low voltage pulsating square wave signal to the detector circuit 37 so as to permit the use of a low cost and yet very sensitive speed indicator that will be uninfluenced by noise. In the illustrated embodiment, the detecting circuit 39 can be incorporated in the CDI ignition system. However, the invention can also be utilized where this detecting circuit is positioned somewhere else in the power head of the outboard motor. Various other changes and modifications may be made without departing from the spirit and scope of the invention, as defined by the appended claims.

I claim:

1. An electric tachometer for an internal combustion engine having a generator for charging a battery, a capacitor discharge system for firing a spark plug for an associated engine, said capacitor discharge system including a capacitor, a charging coil for charging said capacitor and a pulser coil for controlling the discharge of said capacitor to fire the spark plug, and low voltage circuit means, powered by said battery, switch means in circuit with one of said coils and switched by the high voltage output of said one of said coils for switching said low voltage circuit means for providing a low voltage pulsating signal to said tachometer for indicating engine speed.

2. An electric tachometer as set forth in claim 1 wherein the coil switching the battery powered circuit means comprises the charging coil.

3. An electric tachometer as set forth in claim 1 wherein the battery powered circuit means includes a transistor switched by the output of the coil.

4. An electric tachometer as set forth in claim 3 wherein the coil switching the battery powered circuit means comprises the charging coil.

* * * * *